United States Patent Office 3,547,921
Patented Dec. 15, 1970

---

3,547,921
PREPARATION OF 1-SUBSTITUTED-4-ARYL-3,4-DIHYDRO-2(1H)-QUINAZOLINONES
Goetz E. Hardtmann, Florham Park, N.J., and Hans Ott, Basel-Land, Switzerland, assignors to Sandoz-Wander, Inc., Hanover, N.J., a corporation of Delaware
No Drawing. Filed Dec. 26, 1968, Ser. No. 787,254
Int. Cl. C07d 51/48
U.S. Cl. 260—251
5 Claims

ABSTRACT OF THE DISCLOSURE

Disclosed is method for preparation of 4-aryl-2(1H)-quinazolinones involving reaction of a 1-substituted-quinazolinone with an aryl magnesium halide or aryl lithium compound to obtain a 1-substituted-4-aryl-3,4-dihydro-2(1H)-quinazolinone, useful as anti-inflammatory agents. The 3,4-dihydro-2(1H)-quinazolinones may be oxidized to obtain the corresponding 1-substituted-4-aryl-2(1H)-quinazolinones, also useful as anti-inflammatory agents.

---

The present invention relates to preparation of bicyclic compounds. More particularly, the invention relates to preparation of 1-substituted-4-aryl-3,4-dihydro-2(1H)-quinazolinones.

In accordance with the invention 3,4-dihydro-2(1H)-quinazolinones of the Formula I:

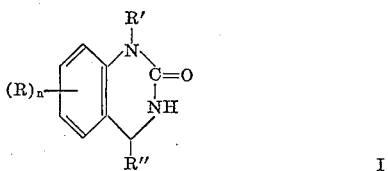

wherein

R is halo of atomic weight no greater than 80; lower alkyl, preferably containing 1 to 3 carbon atoms; or lower alkoxy, preferably containing 1 to 2 carbon atoms;

n is 0 to 2, and when 2 then one and the other R is, independently, halo, lower alkyl or lower alkoxy;

R' is lower alkyl, preferably of from 1 to 5 carbon atoms; and

R" is phenyl or substituted phenyl of the formula:

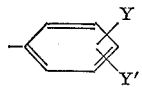

Y represents halo of atomic weight of from 19 to 36; lower alkyl, preferably of 1 to 3 carbon atoms; or lower alkoxy, preferably of 1 to 2 carbon atoms; and Y' represents hydrogen, halo, lower alkyl or lower alkoxy (all as defined for Y);

are prepared by subjecting a 1-substituted-2(1H)-quinazolinone of the Formula II:

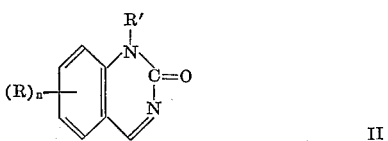

wherein R, n and R' are as above-defined, to reaction in an organic solvent with an aryl magnesium halide or aryl lithium compound respectively of Formula III–A or III–B:

R"MgX III–A or R"Li III–B wherein R" is as defined, and X is chloro or bromo, followed by hydrolysis to obtain said compound of Formula I.

The preparation of compounds I by the process of the invention is carried out in an organic solvent medium at controlled temperatures in the range of from minus 40° C. to 50° C., preferably 10° C. to 35° C., and usually most conveniently at about room temperature (20° C.). The reaction may be suitably carried out in any of the several of the well known organic solvents, preferably an organic ether including both the acyclic and cyclic ethers such as diethyl ether, dimethoxyethane, tetrahydrofuran, or dioxane or mixture of such ethers, more preferably a cyclic ether such as tetrahydrofuran. The mole ratio of the aryl magnesium halide or aryl lithium respectively of Formula III–A or III–B to the quinazolinone of Formula II is not particularly critical. In the more preferred forms of practice an excess of the magnesium halide or lithium compound is employed, typically to provide a ratio in the range of from about 3:1 to 30:1, more preferably 5:1 to 20:1. The preferred reaction involves the compound of Formula II with the lithium compound of Formula III–B. The reaction is completed in a short period typically ranging from 15 minutes to 5 hours. The reaction is desirably conducted under anhydrous conditions and followed by controlled alkaline hydrolysis in a known manner to obtain the 4-aryl-3,4-dihydro-2(1H)-quinazolinone which may be isolated, as desired, by working up by established procedures.

The process of the invention is of interest because it efficiently produces the 4-aryl-3,4-dihydro-2(1H)-quinazolinone of Formula I despite the presence in the starting quinazolinone of Formula II of a carbonyl function with which the aryl magnesium halide and aryl lithium compound respectively of Formula III–A and III–B are well known to readily react under the conditions employed in carrying out the present invention.

The compounds II, III–A and III–B employed in the invention are either known or can be prepared from known materials by established procedures.

It has been found that one may also prepare the 1-substituted-quinazolinones of Formula II by reaction of an appropriately substituted 2-aminobenzaldehyde of Formula IV:

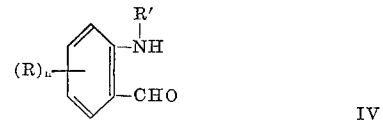

wherein R, n and R' are as defined, with urea at elevated temperatures which may be suitably in the range of 50° C. to 250° C., usually 100° C. to 200° C. The reaction is conveniently carried out in the absence of a solvent in an inert atmosphere provided in a conventional manner, for example, by an inert gas such as nitrogen. The reaction may also be carried out in an inert solvent which may be any of several of the conventional organic solvents, for example, the aromatic solvents such as benzene, toluene and the like. The reaction product of Formula II may be recovered from the reaction mixture for use independently or in the preparation of compounds I by working up by established procedures.

The compounds of structural Formula I are useful because they possess pharmacological activity in animals. In particular, the compounds are useful as anti-inflammatory agents as indicated by the Carrageenan-induced edema test on rats. For such usage, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon known factors such as the compounds used and the mode of administration. However, in general, satisfactory results are obtained when administered at a daily dosage of from about 2 milligrams to about 100 milligrams per kilogram of body weight, preferably given in divided doses 2 to 4 times a day, or in sustained release form. For most mammals the administration of from about 80 milligrams to about 1000 milligrams of the compound per day provides satisfactory results and dosage forms suitable for internal administration comprise from about 20 milligrams to about 500 milligrams of the compound in admixture with a solid or liquid pharmaceutical carrier or diluent.

The process of the invention is also of particular interest because it efficiently produces the 4-aryl-3,4-dihydro-2(1H)-quinazolinones of Formula I which can then be readily converted by subjecting to oxidization to obtain the corresponding 4-aryl-2(1H)-quinazolinones of Formula V:

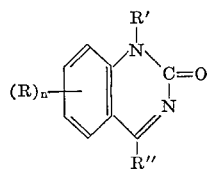

V wherein R, $n$, R' and R" are as above-defined.

The preparation of compounds V from compounds I involving oxidation of a compound I may be carried out in an alert solvent and at temperatures suitably in the range of 0° C. to 50° C., preferably 15° C. to 30° C. Any of the well known suitable inert organic solvents may be employed, for example, dioxane and acetone, preferably dioxane. The oxidizing agents preferably are the alkali metal permanganates such as sodium or potassium permanganate, more preferably potassium permanganate. The product compound V may be isolated by working up in a known manner.

The present invention therefore also provides an efficient two-step overall reaction scheme for preparation of the 4-aryl-2(1H)-quinazolinones of the formula V which are pharmaceutically active and useful as anti-inflammatory agents. For such uses, the compounds V may be administered in modes and dosage forms similar to those for compounds I. The dosage for such uses of compounds I will vary depending on known factor such as the particular compound employed and mode of administration. In general, satisfactory results are obtained at daily dosages in the range of 0.15 milligrams to 100 milligrams per kilogram of animal body weight with daily doses for large mammals being in the range of from 10 milligrams to about 1000 milligrams and dosage forms suitable for internal administration comprising from about 3 milligrams to about 500 milligrams of the compound in admixture with a solid or liquid pharmaceutical carrier or diluent.

The following examples show representative compounds encompassed within the scope of this invention and the manner in which such compounds are prepared. However, it is to be understood that the examples are for purposes of illustration only and are not intended as in any way limiting the scope of the invention.

EXAMPLE 1

1-Methyl-4-phenyl-3,4-dihydro-2(1H)-quinazolinone

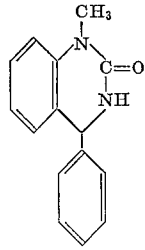

Step A: Preparation of 1-methyl-2(1H)-quinazolinone

A mixture prepared by adding 15 g. of 2-methylaminobenzaldehyde to 15 g. of urea is stirred and heated at 150° C. for 15 hours (nitrogen atmosphere). The reaction mixture is suspended in methylene chloride and extracted with water. The methylene chloride is evaporated in vacuo, the residue dissolved in aqueous hydrogen chloride, filtered and reprecipitated by slow addition of sodium hydroxide solution. The resulting crystalline precipitate is filtered off and dried to obtain 1-methyl-2(1H)-quinazolinone in a form for use in Step B, below. The product can also be dissolved in methanol containing 15% chloroform and the solution saturated with hydrogen chloride to obtain after filtration 1-methyl-2(1H)-quinazolinone hydrochloride, M.P. 233–235° C.

Step B: Preparation of 1-methyl-4-phenyl-3,4-dihydro-2(1H)-quinazolinone

To a solution of 1 g. of 1-methyl-2(1H)-quinazolinone in 200 ml. of anhydrous tetrahydrofuran is added 5.0 ml. of phenyl-lithium in solution(2M) in benzene/diethyl ether (70/30). The temperature is kept at about 25–30° C. for one hour, after which water and methylene chloride are added, and the two resulting layers are separated. The aqueous layer is extracted with methylene chloride and the combined organic phases are repeatedly extracted with saturated sodium chloride solution. After drying the solvent is evaporated in vacuo and the residue crystallized from methanol to obtain 1-methyl-4-phenyl-3,4-dihydro-2(1H)-quinazolinone, M.P. 183–184° C.

EXAMPLE 2

1-Ispropyl-7-methyl-b-phenyl-3,4-dihydro-2(1H)-quinazolinone

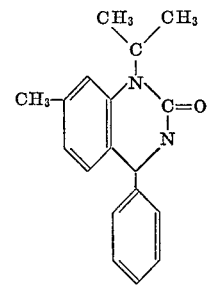

Following the procedure of Step B of Example 1, and employing approximately equivalent amounts, 1-isopropyl-7-methyl-2(1H)-quinazolinone is reacted with phenyl lithium to obtain 1-isopropyl-7-methyl-4-phenyl-3,4-dihydro-2(1H)-quinazolinone, M.P. 159–162° C.

EXAMPLE 3

1-Methyl-4-phenyl-2(1H)-quinazolinone

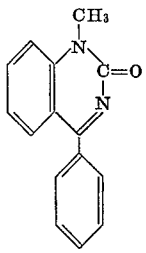

To a solution of 4.7 g. of 1-methyl-4-phenyl-3,4-dihydro-2(1H)-quinazolinone (prepared as in Example 1) in 200 ml. of purified dioxane is slowly added within 10 minutes at room temperature a solution of 2.35 g. of potassium permanganate in 45 ml. of water. The resulting mixture is stirred for 1 hour at room temperature and then formic acid is added dropwise to destroy excess permanganate. The resulting mixture is filtered, and the filtrate concentrated in vacuo to about 30 ml. To this liquid residue is added slowly 50 ml. of water to obtain a precipitate which is recrystallized from ethyl acetate to obtain 1-methyl-4-phenyl-2(1H)-quinazolinone, M.P. 142–143° C.

EXAMPLE 4

1-isopropyl-7-methyl-4-phenyl-2(1H)-quinazolinone

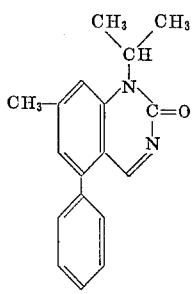

Following the procedure of Example 3, and employing approximately equivalent amounts, 1-isopropyl-7-methyl-4-phenyl-3,4-dihydro-2(1H)-quinazolinone (prepared as in Example 2) is reacted with potassium permanganate to obtain on crystallization from ethyl acetate the compound which is 1-isopropyl-7-methyl-4-phenyl-2(1H)-quinazolinone, M.P. 137–138° C.

The word "lower" as used herein in association with such terms as "lower alkyl", "lower alkoxy," and the like shall be taken as indicating an organic substituent of from 1 to 6 carbon atoms, inclusive, unless otherwise defined herein.

What is claimed is:

1. A process for preparation of 3,4-dihydro-2(1H)-quinazolinone of the formula

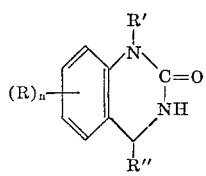

wherein

R is halo of atomic weight no greater than 80; lower alkyl; or lower alkoxy;

$n$ is 0 to 2, and when 2 then one and the other R is, independently, halo, lower alkyl or lower alkoxy;

R' is lower alkyl, and

R'' is phenyl or substituted phenyl of the formula:

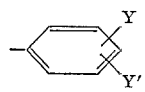

Y represents halo of atomic weight of from 19 to 36; lower alkyl; or lower alkoxy; and Y' represents hydrogen, halo, lower alkyl or lower alkoxy;

which process comprises reacting a compound of the formula

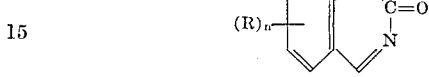

wherein R, $n$ and R' are as above-defined, with a compound from the group of (a) R''MgX and (b) R''Li wherein R'' is as above-defined, and X is chloro or bromo, in an inert organic solvent at a temperature in the range of minus 40° C. to 50° C., followed by hydrolysis to obtain said 3,4-dihydro-2(1H)-quinazolinone.

2. The process of claim 1 in which R' is methyl.

3. The process of claim 1 in which R' is isopropyl.

4. The process of claim 2 or 3 in which the R''Li is employed.

5. The process of claims 2, 3 or 4 in which the reaction is carried out at a temperature in the range of 10° C. to 35° C.

References Cited

UNITED STATES PATENTS 3,305,553  2/1967  Hoefle et al. _____ 260—256.4

OTHER REFERENCES

Armarego: "Advances in Heterocyclic Chemistry," vol. I, 1963, Academic Press, pp. 264, 289.

ALEX MAZEL, Primary Examiner

R. V. RUSH, Assistant Examiner

U.S. Cl. X.R.

260—577; 424—251